(No Model.) 2 Sheets—Sheet 1.

H. C. GOODELL.
REFRIGERATOR.

No. 252,097. Patented Jan. 10, 1882.

Attest:
R. H. Barnes
S. W. Luly

Inventor.
Henry C. Goodell
by Ellis Spear
Attorney (No Model.)   2 Sheets—Sheet 2.

H. C. GOODELL.
REFRIGERATOR.

No. 252,097.   Patented Jan. 10, 1882.

Attest:
R. F. Barnes.
S. W. Luly.

Inventor:
Henry C. Goodell
by Ellis Spear
Attorney

UNITED STATES PATENT OFFICE.

HENRY C. GOODELL, OF ATCHISON, KANSAS.

REFRIGERATOR.

SPECIFICATION forming part of Letters Patent No. 252,097, dated January 10, 1882.

Application filed May 7, 1881. (No model.)

*To all whom it may concern:*

Be it known that I, HENRY C. GOODELL, of Atchison, in the county of Atchison and State of Kansas, have invented a new and useful Improvement in Refrigerators; and I do hereby declare that the following is a full, clear, and exact description of the same.

My invention relates to refrigerators of that class of a larger size which are used in markets, hotels, and the like; and it consists, first, of a refrigerator or refrigerating-room having an ice-box occupying the entire upper part and suspended from the ceiling, in combination with a series of drainage-bars, whereby the water of condensation and of the melting ice is carried off.

It consists, further, of certain details of construction hereinafter fully described, and indicated in the claims.

Figure 1:
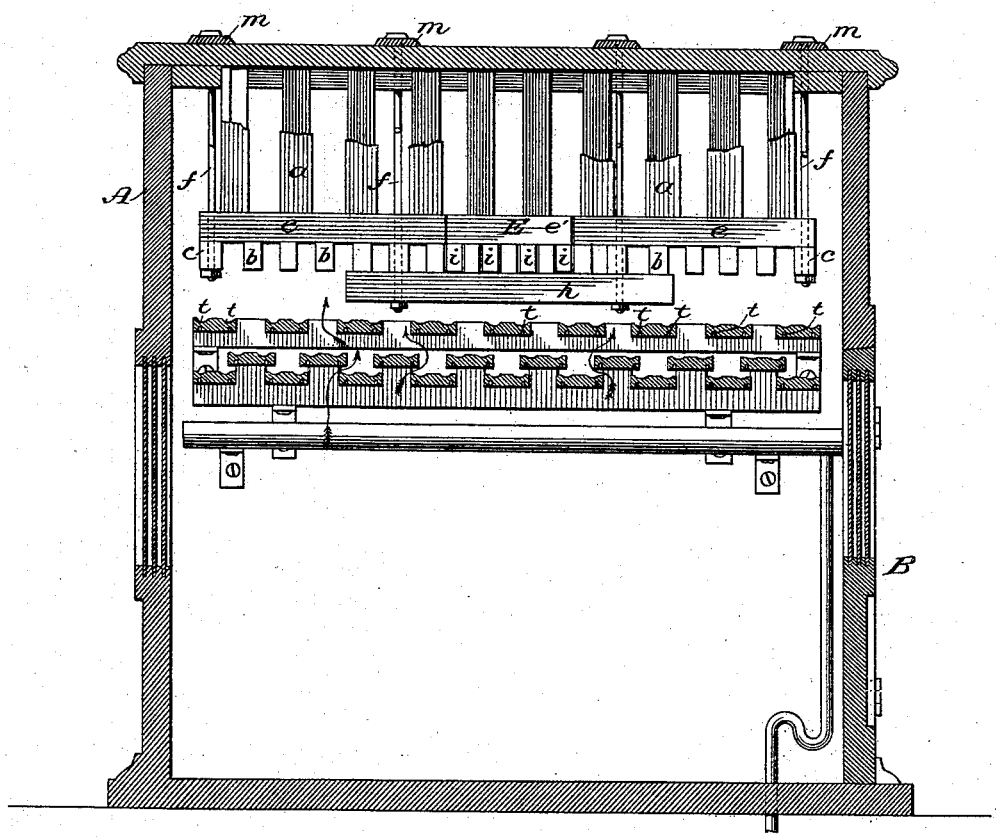
Figure 2:
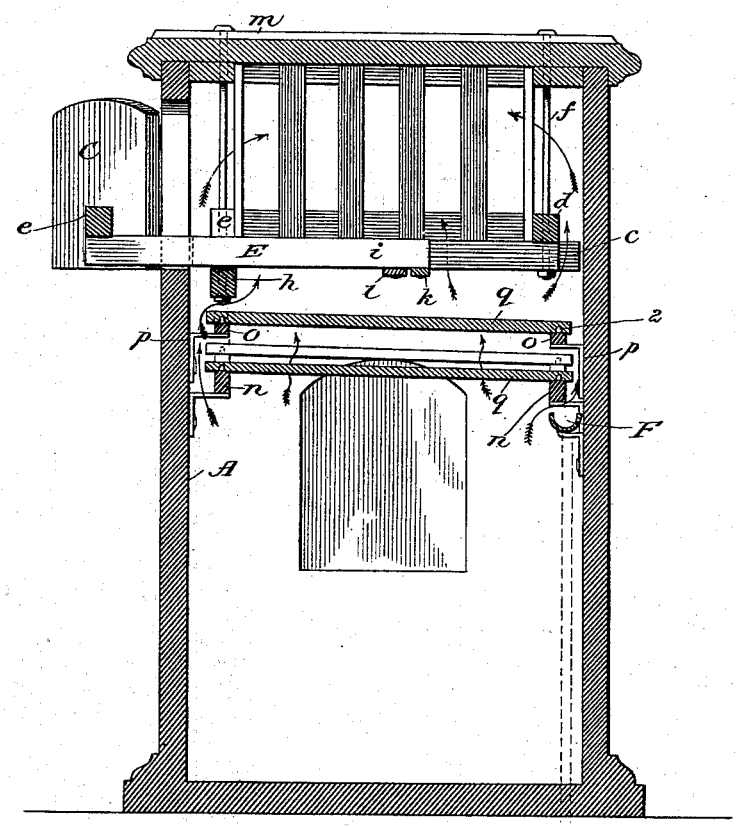
Figure 3:
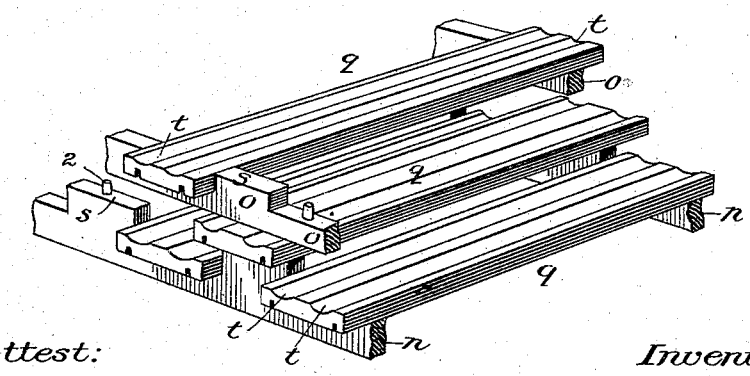

In the accompanying drawings, Figure 1 represents a central section transversely of the drip-bars; Fig. 2, a section longitudinal of said bars; Fig. 3, a separate view of the drain-boards. The sections show the entire structure.

The essential principle of my invention is based upon the observed fact that in refrigerating-rooms of this class the air and moisture from the meats and like substances introduced into the lower part of the chamber rise rapidly to the top; and my invention has in view the suspension of a mass of ice throughout the upper part of the chamber over suitable draining-strips, so that this warm air, as it rises, is suddenly and uniformly chilled, leaving its moisture upon the ice itself, to be carried off with the water resulting from the melting of the ice.

In these drawings, the walls of the main chamber are indicated at A. A door, B, affords access to the users, and a small upper door, C, serves to admit ice. The cage which holds the ice is composed of vertical bars $a$ $a$ and transverse bars $b$ $b$, connected to the side and end timbers, which are upheld by suspension-rods $f$. The end timbers of the frame are shown at $c$ $c$. They are rabbeted across the ends and receive the overlying ends of the side pieces, $d$ $e$ $e$. The side piece $d$ extends the whole length of the cage, across the rear thereof, and is supported by four rods, $f$, (any suitable number may be used,) those at the corners, both in front and rear, passing through both side and end pieces. The beams $e$ on the front side are supported in like manner, but are cut away to leave a space in the center, and are provided with a supplemental beam, $h$, which extends under the open space between the ends of the beams $e$ $e$.

It will be observed that the cross-beams or scantlings are suspended underneath the side beams, $d$ and $e$, and, excepting at the points where they rest upon the beam $h$, they are easily removable without disturbing any other part. In like manner, the vertical bars $a$ are made independently removable, being screwed or bolted at their lower ends to the inner surface of the side and end beams and at their upper ends to like inner surface of the upper framework.

The open space between the ends of the beams $e$ $e$ permits a sliding frame, E, to be drawn in and out. This sliding frame is composed of bars $i$ $i$, which slide between the transverse bars $b$ of the cage. They are connected at the inner end, preferably by a metal strip, $k$, underneath the bars $b$, attached to each one of the bars $i$ $i$. A second bar, $l$, extends across the bars $b$, and is connected thereto underneath the sliding frame. This serves to limit the forward movement of said frame as well as to sustain it.

A piece, $e'$, is attached to the front end of the bars $i$, and when the sliding frame is pushed in fits into the space between the ends of the beams $e$. This sliding frame, when the cage is in place, is directly opposite the small upper door, C, and when that door is open the sliding frame may be drawn out to receive blocks of ice, which, being deposited upon the outer end of said sliding frame, are easily pushed in with the frame, and may then be shifted to either end. The suspension-rods pass through the top of the chamber and through strips $m$, on which they rest by means of nuts or heads, the said strips serving to distribute the strain.

Just below the cage is arranged the drip mechanism. On each side of the refrigerator are two bars, $n$ and $o$, supported a little distance from the wall by means of brackets $p$. The upper edges of these bars are cut away at intervals to receive the drain-boards $q$. These drain-boards are made preferably eight inches wide, and are set about four inches apart. The lower bars, n, are recessed to a depth greater than the thickness of the drain-boards, and upon the projections s between said recesses, is supported a second series of drain-boards, each one of which overlaps the edges of two of the first series of drain-boards, which rest in the notches. The third series of drain-boards are supported in notches in the bars o, which notches are arranged so as to bring the said third series of drain-boards directly over the space between the second series. Dowel-pins 2 secure the boards q to cross-bars n and o. These drain-boards are made, as shown in section, with a groove on each side, and inclined slightly from front to rear, whereby the water is carried back and discharged into a trough, F, attached to the back side directly under the ends of the lower series of drain-boards.

Water from the trough may be led to the outside by means of a pipe passing through the wall or flooring and provided with a suitable trap. The drain-boards have also slight grooves t t on their under surfaces, near the edges, which serve to arrest and carry off any drips which may gather underneath.

The trough is supported upon brackets in the same manner as the bars, leaving a clear space next the wall for the free circulation of air.

I provide the door B with a window, preferably of plate-glass, said window being composed of three plates—an inner and two outer—forming two air-chambers, which affords more effectual resistance to the passage of heat and to any obscuring of the glass by condensation. I do not, however, limit myself to the location of the window in the door. It may be necessary in some locations of the refrigerator to place the window elsewhere. I prefer lining these chambers with my improved lining of lamp-black; but any other suitable substance may be used, if preferred.

It should be observed that a space of about one inch is left between the series of drain-boards, so that there is free passage for the air to rise up through the drain-boards, passing around the edges thereof; but as the boards of each series overlap each other, it is not possible for the water from the melting of the ice to fall down through, and this improved refrigerating-room has been found in practice to be as dry when in use as an ordinary room. The same arrangement of ice-cage and drain-boards may be used in connection with supports for said cage resting below, instead of suspension-rods; but the plan of suspending from the ceiling is better, inasmuch as it does not occupy and obstruct the chamber with any supporting devices.

Having thus described my invention, what I claim is—

1. The described cage, consisting of the beams c d e e, bars a b, and suspending-rods, substantially as described.

2. The combination, with the ice-cage and the refrigerating-chamber, of the sliding frame E and door C, substantially as described.

3. The draining apparatus, consisting of the side bars, n and o, notched as described, and the drain-boards arranged on said bars, as set forth.

4. The combination of the bars n and o, notched and provided with the dowel-pins, as described, with the three series of drain-boards arranged on said bars, as set forth.

In testimony whereof I have signed my name to this specification in the presence of two subscribing witnesses.

HENRY C. GOODELL.

Witnesses:
B. P. WAGGENER,
FRANK ROYSE.